Figure 1:
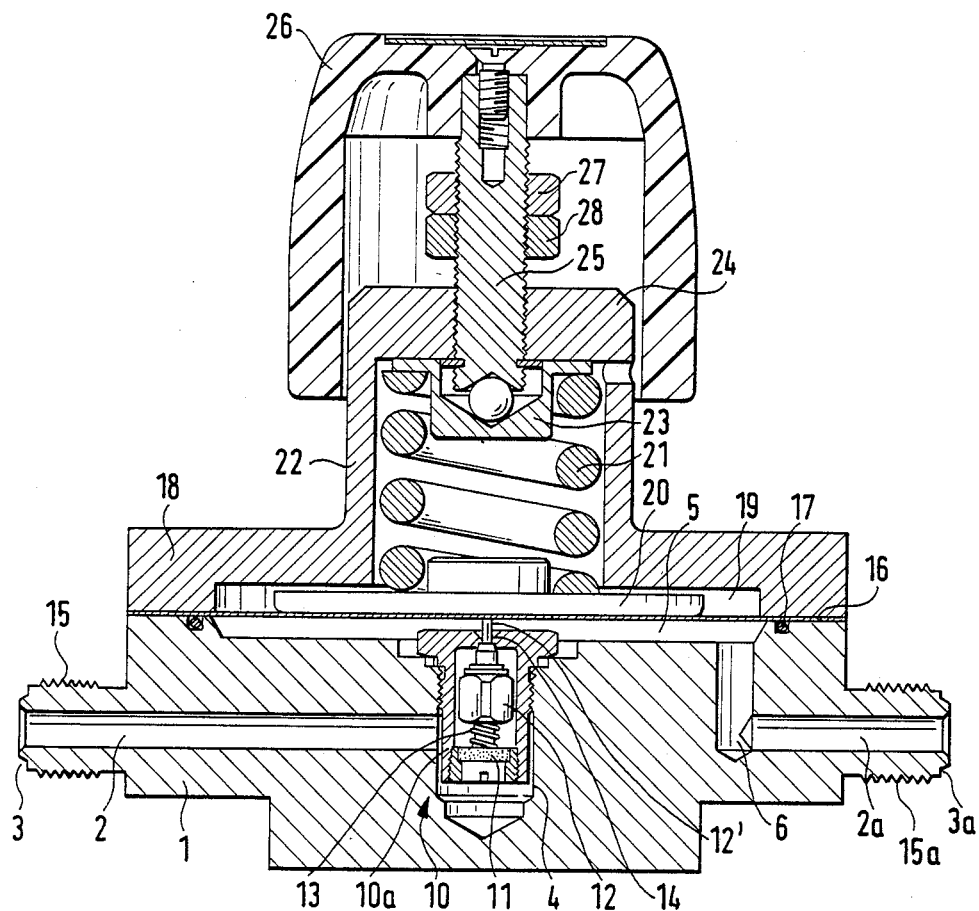

United States Patent [19]

Siebald

[11] Patent Number: 4,741,359

[45] Date of Patent: May 3, 1988

[54] PRESSURE REDUCER

[75] Inventor: Hansjurgen F. Siebald, Weinheim, Fed. Rep. of Germany

[73] Assignee: DruVa Sonderventile GmbH, Eppelheim, Fed. Rep. of Germany

[21] Appl. No.: 919,809

[22] Filed: Oct. 16, 1986

[30] Foreign Application Priority Data

Oct. 31, 1985 [DE] Fed. Rep. of Germany ....... 3538828

[51] Int. Cl.⁴ .............................................. F16K 31/12
[52] U.S. Cl. .............. 137/505.42; 137/550; 251/367; 251/368
[58] Field of Search .......................... 137/505.42, 550; 251/366, 367, 368

[56] References Cited

U.S. PATENT DOCUMENTS

| | | | |
|---|---|---|---|
| 1,566,255 | 12/1925 | Spreen | 137/505.42 |
| 1,739,926 | 12/1929 | Stettner | 137/505.42 |
| 2,073,178 | 3/1937 | Rich | 251/368 |
| 2,095,210 | 10/1937 | Bucknam | 251/368 |
| 2,133,742 | 10/1938 | Forbes | 251/366 |
| 2,967,704 | 1/1961 | Hammon | 137/505.42 |
| 4,471,802 | 9/1984 | Pryor | 137/505.42 |

FOREIGN PATENT DOCUMENTS 8000433  10/1980  Fed. Rep. of Germany .

Primary Examiner—A. Michael Chambers
Attorney, Agent, or Firm—Helfgott & Karas

[57] ABSTRACT

Pressure reducer for ultra-pure gases with a solid, block-like casing body (1), which has a plurality of fluid channels (2, 2a, 2b, 2c) running radially towards the center of the casing body (1) connected to projecting tubular connecting pieces (3, 3a, 3b, 3c).

To keep the pressure reducer completely free from gaps and dead spaces, the connecting pieces are constructed in one piece with the casing body.

14 Claims, 3 Drawing Sheets

PRESSURE REDUCER

The invention relates to a pressure reducer for ultra-pure gases with a solid, blocked-like casing body, which has a plurality of fluid channels running radially towards the centre of the casing body and linked with projecting, tubular connecting pieces.

The connecting pieces of known pressure reducers are connected to channels in the casing body, which terminate at different radial positions and generally pass into axial channels, so that a fluid can be supplied to or removed from the desired parts of the regulating valve of the pressure reducer by means of the connecting pieces and fluid channels. In the known pressure reducers, the tubular connecting pieces are fitted into corresponding bores in the compact casing body and are welded there.

DE-OS No. 21 05 419 discloses a distribution means for several supply lines comprising a main line and several secondary lines branching at right angles to the main line. Just downstream of the branching point, the secondary lines contain a valve body. The branch valve bodies are integrally cast with the main line, i.e. are constructed in one piece therewith. This specification does not disclose a pressure reducer.

It is also known to manufacture pressure reducers having only a single high pressure feedline and a single low pressure drainline aligned therewith with a one-piece casing body.

If a pressure reducer of the aforementioned type is used for ultra-pure doping gases, such as are required e.g. in microelectronics for producing semiconductor components, several important disadvantages and problems occur. Thus, e.g. despite the most careful precautions, very small dust particles and water droplets can be detected in the gas stream leaving the pressure reducer. Such disturbing particles and droplets cannot be accepted with the high precision requirements now made in connection with the manufacture of electronic semiconductor components, because as a result of the presently conventional tight surface occupancy of semiconductor components, such particles and droplets can lead to considerable problems on the component, i.e. to the production of waste.

The problem of the present invention is to provide a pressure reducer of the aforementioned type, which permits the processing of ultra-pure gases and ensures that the gas stream leaving the casing body contains no foreign particles, particularly water droplets, aerosols or dust particles.

According to the invention this problem is solved in that the connecting pieces are constructed in one piece with the casing body.

Thus, it has surprisingly been found that the appearance of the aforementioned disturbing particles and droplets is due to the fact that over a long operating period, foreign bodies, such as e.g. water droplets can build up at very fine cracks or joints of the casing body and then after a long period tear loose and pass into the fluid flow. It has been found that the aforementioned manner of fixing the connecting pieces to the casing body made it possible for very fine grooves and joints to form, so that the foreign substances can accumulate to form a disturbing particle or droplet. According to the inventive solution of constructing the connecting pieces in one piece with the casing body, it is ensured that no gap remains between the tubular connecting piece and the body, which could lead to the aforementioned disadvantageous results. Thus, the gas can be fed in gap-free manner and without dead spaces to the functional elements of the pressure reducer.

According to a particularly advantageous embodiment, the casing body is made from high-grade steel. This is particularly advantageous when processing ultra-pure doping gases, such as are used in semiconductor technology.

According to a further advantageous embodiment, Cr-Ni steels have proved particularly suitable due to their surface quality and corrosion resistance.

For the one-piece construction of the casing base and its connecting pieces, the following steel has proved to be particularly advantageous:
Cr—10.5 to 20%, preferably 16.5 to 18.5%
Ni—8.5 to 14%, preferably 11% to 14%
C—0.03 to 0.12%, preferably 0.03 to 0.07%.

The casing body according to the invention is advantageously produced by turning or milling, i.e. the tubular connecting pieces are to a certain extent turned "from the solid".

Another embodiment of the invention, in which the casing body is forged or rolled, is characterized by lower material consumption. The same applies with regards to an embodiment in which the casing body is cast.

According to another advantageous embodiment the casing body surfaces are internally and externally electropolished. This gives completely smooth surfaces, so that it is not possible for dirt particles or water droplets to be deposited.

According to another advantageous embodiment, the connecting pieces are widened at their end directed towards the casing body, which gives a particularly stable form. It has proved advantageous to give the casing body an outer contour in the form of a regular polygon, e.g. a hexagon, several connecting pieces being in each case arranged centrally on the lateral faces of the polygon. Particularly when producing the casing body by turning or milling, this construction principle has proved particularly favourable.

The end faces of the free ends of the connecting pieces are appropriate for performing orbital or butt welding. With this welding method, no joints, gaps or cracks occur at the weld which could form the source of the undesired particle or droplet accumulations.

The invention is described in greater detail hereinafter relative to non-limitative embodiments and the attached drawings, wherein show:

FIG. 1 An axial section through line I—I of the pressure reducer shown in FIG. 1.

Figure 2:
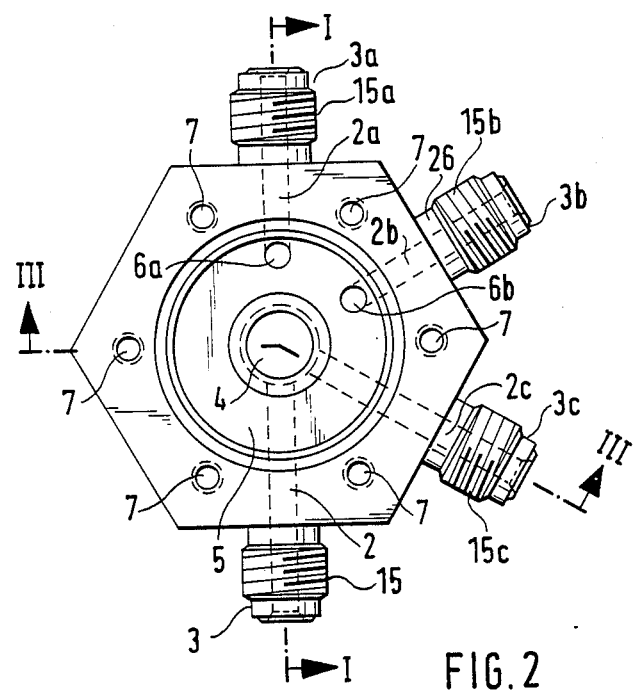

FIG. 2 A plan view of the casing body of the pressure reducer of FIG. 1 on a smaller scale.

Figure 3:
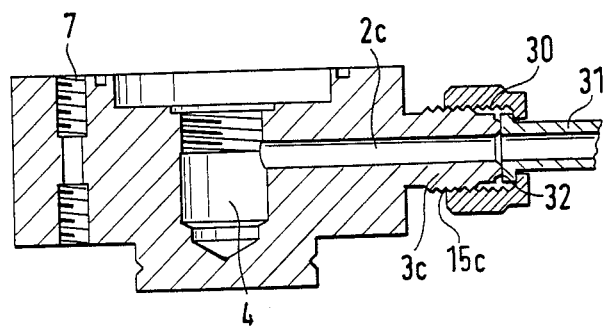

FIG. 3 An axial section along section line III—III in FIG. 2.

Figure 4:
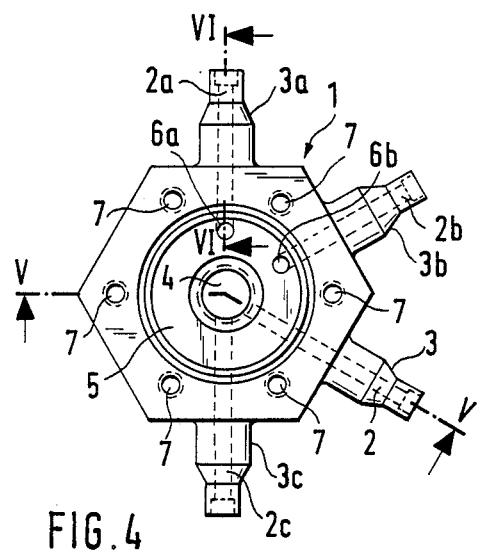

FIG. 4 A plan view of a casing body according to a further embodiment.

Figure 5:
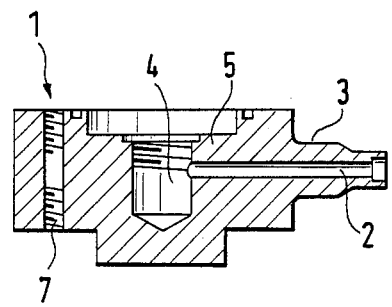

FIG. 5 An axial section along section line V—V in FIG. 4.

Figure 6:
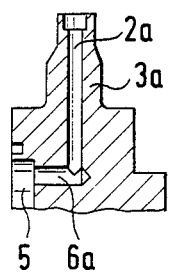

FIG. 6 A section along section line I-VI in FIG. 4.

For the same or similar parts, the same reference numerals are used.

The pressure reducer shown in FIG. 1 has a casing body 1, which essentially comprises a solid high-grade steel block which is hexagonal in plan view. A central recess 4 for receiving a regulator insert 10 is provided therein. A radial channel 2 extends at right angles to the longitudinal axis of recess 4 and issues roughly centrally in the jacket of the recess 4. Recess 4 is in the form of a blind bore. It passes in the form of several steps into a widened section 5 at its open end. An axially parallel, eccentrically positioned channel 6, which is connected to a further radial channel 2a, is in communication with this widened section 5 of recess 4.

Radial channels 2, 2a pass outwards into connecting pieces 3 or 3a. The connecting pieces are formed from a suitably sized blank material by turning and milling around the connecting pieces, thereby leaving the latter. Thus, connecting pieces 3, 3a are integral with the casing body and are respectively formed with integral external threads 15, 15a. The external thread is also integral with the connecting piece and the casing body. The external threads are adapted to receive box nuts, as will be explained hereinafter. A regulator insert 10 is fitted into recess 4. Insert 10 comprises generally cylindrical casing 10a with an external thread, which is screwed into a corresponding thread formed in the inner wall of recess 4. In the area where the radial channel 2 issues into recess 4, the diameter of the regulator insert casing 10a is smaller than the internal diameter of recess 4, so that an annular clearance is obtained. On an end face portion facing the blind end of recess 4, the regulator insert 10 is provided with a sintered metal filter 11. On the opposite side, regulator insert 10 has a seating nozzle 14, into which a regulating cone 12 projects, which cone is biased by a compression spring 13 in the direction of nozzle 14 to close the latter.

On the open side of recess 4, casing body 1 is covered by an elastic diaphragm 16. In order to produce a tight connection an annular slot 17 is provided in the casing body 1, an O-ring packing being in turn provided in the slot. The elastic diaphragm 16 is pressed against the casing body 1 by a casing cover 18. Pressing the casing cover 18 against the casing body 1 is effected by axially directed screws (not shown), which screws are received in threaded openings 7 (see FIG. 3) formed in the casing body.

The shape of casing cover 18 is adapted to that of casing body 1. On its side facing casing body 1, it has a cylindrical depression 19, whose diameter roughly corresponds to the diameter of the widened section 5 of recess 4, so that the diaphragm 16 passes approximately through the centre of the axially directed cylindrical space formed between the widened section 5 of recess 4 and the cylindrical depression 19 in casing cover 18. On the side of diaphragm 16 facing casing cover 18, is provided a disk 20 which serves as a seat for a compression spring 21. Compression spring 21 is guided in an axially extending tubular portion 22 of casing cover 18 and bears against disk 20 and a second seat 23 of compression spring 21, which second seat is axially displaceable. For this purpose, a central bore with an internal thread is provided in plate 24 terminating the tubular portion 22. A spindle 25 projects through the bore and is supported by a spherical ball on the second seat 23. Spindle 25 can be turned by means of a handwheel 26. Two stop nuts 27, 28 are used for limiting the axial displacement of threaded spindle 25.

The pressure reducer functions in the following way. High pressure gas flows through radial channel 2 into the annular space formed between the regulator insert casing 10a and the wall of recess 4 and from there flows, via the sintered metal filter 11, into the inner space of casing 10a. Because of the tension of compression spring 21, diaphragm 16 is forced in the direction of the regulating cone 12 and is supported on its pin-like shoulder part 12′. Accordingly, regulating cone 12 is moved from the seat on nozzle 14 and thus provides an annular clearance. The gas which has passed into the inner space of regulator insert 10 flows via said annular clearance into the widened section 5 of recess 4. As a function of the amount of gas drained off via the eccentric axial channel 6 and radial channel 2a, a pressure builds up in the space formed between diaphragm 16 and widened section 5, which forces the diaphragm 16 away from the seating nozzle 14 counter to the tension of spring 21. Also, by virtue the action of compression spring 13, regulating cone 12 is forced in the direction of the seat on nozzle 14 and the annular clearance between regulating cone 12 and the nozzle 14 is reduced or closed. This reduces or closes off the gas supply in the low pressure part formed by the widened section 5 and channels 6 and 2a. Thus, there is a constant pressure in said low pressure part, which within wide limits is independent of the quantity of gas removed by means of the connecting piece 3a. The magnitude of the pressure is only dependent on the ratio of the oppositely directed forces acting on the diaphragm.

By turning handwheel 26 to the right, spindle 25 is screwed into casing cover 18, so that the spring seat 23 is moved towards the diaphragm 16, so that the spring tension acting on the latter is increased. This means that for obtaining an equilibrium of forces in the widened section 5, there must also be an increased pressure. For as long as this increased pressure is not obtained, the tension of spring 21 forces the diaphragm in the direction of nozzle 14 and opens same, so that high pressure gas can continue to flow until an equilibrium of forces is obtained and seating nozzle 14 is closed to such an extent that the inflowing gas quantity is the same as the outflowing gas quantity, so that a constant pressure is obtained.

The casing body 1 is shown in plan view in FIG. 2. As can be seen in FIG. 2, it comprises a hexagonal, solid block. FIG. 2 also shows the central recess 4 with its widened section 5, as well as the radial channel 2 issuing on one side wall of central recess 4. A further radial channel 2c is provided displaced by 60° with respect to channel 2, so that the two channels 2, 2c run radially towards the centre of the casing body.

Eccentrically arranged axial channels 6a, 6b issue into the widened section 5 of recess 4. The eccentric axial channels 6a, 6b are in turn respectively connected to the radial channels 2a,2b running radially towards the centre of the casing body. Six longitudinal threaded bores 7 in the casing body serve to receive screws for fixing casing cover 18 to casing body 1. Connecting pieces 3, 3a, 3b and 3c respectively aligned with channels 2, 2a, 2b and 2c are integrally formed with and provided at at least four of the six lateral faces of the casing body. They are produced in that material is removed by turning and milling around the connecting pieces from a blank of a suitable size to leave integrally formed connecting pieces. Connecting pieces 3, 3a, 3b, 3c in each case have an external thread 15, 15a, 15b, 15c, which is also turned in one piece.

FIG. 3 is a section along section line III—III of FIG. 2 and shows the compact casing body 1 with a central recess 4, radial channel 2c issuing from the side wall of the central recess 4. Connecting piece 3c is in one piece with the remaining parts of casing body 1. Channel 2c, which continues up to the end of connecting piece 3c, is formed by a drilling operation. Its external thread 15c cooperates with the internal thread of a box nut 30. A connecting pipe section 31 having a pressing shoulder 32 is firmly pressed against the end face of connecting piece 3c by box nut 30. As a function of intended use, a packing washer can be provided between the end face of connecting piece 3c and the end face of pipe section 31. Preferably such a (not shown) packing is made from silver-plated high-grade steel or is electropolished. Such a connection can be made completely free of dead spaces and gaps to prevent deposition of very fine particles and droplets. With the same objective in mind, the complete casing body is internally and externally electropolished.

FIG. 4 shows another embodiment, whereof only the casing body is shown, because the construction of the remaining parts of the pressure reducer does not differ from that according to FIG. 1. The casing body according to FIG. 4 comprises a hexagonal, solid high-grade steel block, in which is provided a central recess 4 for receiving a regulating valve. Radial channels 2, 2c issue on one side wall of the central recess 4.

Recess 4 has a widened section 5, into which issue the eccentrically arranged axial channels 6a, 6b, which are connected to radial channels 2a or 2b. Six longitudinal threaded bores 7 in the casing body receive screws for fixing a casing cover, which is tightly engaged on the casing body, whilst interposing a spring loaded diaphragm, so that the widened section 5 and recess 4 are effectively closed.

Connecting pieces 3, 3a, 3b, and 3c respectively aligned with channels 2, 2a, 2b and 2c are provided at least four of the six lateral faces of the casing body. They are formed in the same manner as previously described with respect to the embodiment of FIGS. 1 to 3. Connecting pieces 2, 2a, 2b, 2c are worked to have a reduced diameter at their free ends, whilst they are widened towards the casing body to provide a particularly stable construction. The end faces of the free ends are appropriate for orbital welding under inert gas. This welding operation will be completely free from hairline cracks, so that the path of the gas introduced into and removed from the casing body will be completely free from dead spaces and gaps, which could favour the accumulation of very fine particles and droplets. With the same objective in mind, the complete casing body is internally and externally electropolished.

FIG. 5 is a section along section line V—V in FIG. 4 and shows the compact casing body 1 with the central recess 4. Radial channel 2 issues on one side wall of central recess 4. Connecting piece 3 is integral with the remaining parts of the casing body. Channel 2, which is continued up to the end of connecting piece 3, is formed by drilling. The free end of connecting piece 3 is suitable for orbital welding.

FIG. 6 shows a section along section line VI—VI in FIG. 4, the connecting piece 3a essentially corresponding to connecting piece 3 of FIG. 4. However, unlike in the section according to FIG. 4, the radial channel 2a passes into an axial channel 6a, which in turn passes into the widened section 5 of recess 4.

I claim:

1. Pressure reducer for ultra-pure gases, comprising a one piece solid block-like casing body formed at one of its ends with a central recess adapted to receive a tubular regulator and which in plan view exhibits an outer contour of a polygon, said one-piece casing body having a planar closure wall, at an end opposite said one of its ends, spaced from said central recess, a plurality of fluid channels directed radially inwardly from outer side faces of said polygon toward the center of said casing body and extending outwardly from said casing body into and through connecting pieces outwardly projecting from central regions of at least some of said side faces of said polygon, said connecting pieces being integrally formed with said casing body and constituting therewith said one piece block-like casing body.

2. Pressure reducer according to claim 1, characterized in that the casing body is made from high-grade steel.

3. Pressure reducer according to claim 1, characterized in that the casing body is made from a Cr-Ni steel.

4. Pressure reducer according to claim 1, characterized in that the casing body is made from a steel with the following composition:
Cr—10.5 to 20%, preferably 10.5 to 18.5%
Ni—8.5 to 14%, preferably 11 to 14%
C—0.03 to 0.12%, preferably 0.03 to 0.07%.

5. Pressure reducer according to claim 1, characterized in that the casing body is formed from a blank.

6. Pressure reducer according to claim 1, characterized in that the casing body is a rolled body.

7. Pressure reducer according to claim 1, characterized in that the casing body is a cast body.

8. Pressure reducer according to claim 1, characterized in that the casing body has electropolished surfaces.

9. Pressure reducer according to claim 1, characterized in that the connecting pieces are tapered to a reduced size towards the free ends thereof.

10. Pressure reducer according to claim 1, characterized in that the end faces of the free ends of the connecting pieces are shaped to permit orbital welding.

11. Pressure reducer according to claim 1, characterized in that the connecting pieces have external threads adapted for threaded engagement with box nuts for interconnecting pipe sections with said connecting pieces.

12. The pressure reducer of claim 1, wherein the casing body is a forged body.

13. Pressure reducer for ultra-pure gases, comprising a one piece solid block-like casing body formed at one of its ends with a central recess adapted to receive a tubular regulator and which in plan view exhibits an outer contour of a polygon, said one-piece casing body having an integral planar closure wall, at an end opposite said one of its ends, spaced from said central recess, a plurality of fluid channels directed radially inwardly from outer side faces of said polygon toward the center of said casing body and extending outwardly from said casing body into and through connecting pieces outwardly projecting from central regions of at least some of said side faces of said polygon, said connecting pieces being integrally formed with said casing body and constituting therewith said one piece block-like casing body, said recess being in fluid communication with said channels in part determined by position of a regulating cone within a tubular regulator arranged within said recess, said tubular regulator having a reduced diameter portion such that an annular space is formed between a wall portion of said recess and said reduced diameter portion of the tubular regulator, at least one of said fluid channels communicating with said space, and a metal filter within said tubular regulator in a path of fluid flow from said space into and through said tubular regulator.

14. Pressure reducer for ultra-pure gases, comprising a one-piece solid block-like casing body having a longitudinal axis and being formed at one of its ends with a recess extending inwardly adjacent to an opposite closed end of the body, said body having integral laterally extending connecting pieces in perpendicular relation to said longitudinal axis, said connecting pieces having a dimension, in direction of said longitudinal axis, smaller than that between said one and said opposite ends of said body, and a plurality of fluid channels through said integral connecting pieces and extending into said body in operative communication with said recess, said recess being in fluid communication with said channels in part determined by position of a regulating cone within a tubular regulator arranged within said recess, said tubular regulator having a reduced diameter portion such that an annular space is formed within a wall portion of said recess and said reduced diameter portion of the tubular regulator, at least one of said fluid channels communicating with said space, and a metal filter within said tubular regulator in a path of fluid flow from said space into and through said tubular regulator.

* * * * *

UNITED STATES PATENT AND TRADEMARK OFFICE
CERTIFICATE OF CORRECTION

PATENT NO. : 4,741,359

DATED : May 3, 1988

INVENTOR(S) : Hansjurgen Siebald

It is certified that error appears in the above-identified patent and that said Letters Patent is hereby corrected as shown below:

Item [73] on the cover sheet; change

"DruVA Sonderventile GmbH" to

--DruVA-Armaturen GmbH--.

Signed and Sealed this

Eleventh Day of October, 1988

Attest:

DONALD J. QUIGG

*Attesting Officer*   *Commissioner of Patents and Trademarks*